(12) United States Patent
Chase

(10) Patent No.: US 12,272,248 B1
(45) Date of Patent: Apr. 8, 2025

(54) MARINA SLIP OCCUPANCY DETECTION

(71) Applicant: William Chase, Avon, CT (US)

(72) Inventor: William Chase, Avon, CT (US)

(*) Notice: Subject to any disclaimer, the term of this patent is extended or adjusted under 35 U.S.C. 154(b) by 0 days.

(21) Appl. No.: 18/594,421

(22) Filed: Mar. 4, 2024

(51) Int. Cl.
*G08G 3/00* (2006.01)
*G06Q 30/0645* (2023.01)
*G06Q 50/40* (2024.01)

(52) U.S. Cl.
CPC ........... *G08G 3/00* (2013.01); *G06Q 30/0645* (2013.01); *G06Q 50/40* (2024.01)

(58) Field of Classification Search
CPC ....... G08G 3/00; G06Q 50/40; G06Q 30/0645
USPC ..................................................... 340/932.2
See application file for complete search history.

(56) References Cited

U.S. PATENT DOCUMENTS

| | | | |
|---|---|---|---|
| 9,997,070 B1* | 6/2018 | Komanduri | G08G 1/146 |
| 10,551,489 B2* | 2/2020 | Richard | G08G 1/042 |
| 2012/0245966 A1* | 9/2012 | Volz | G05B 19/048 |
| | | | 705/5 |
| 2012/0323643 A1* | 12/2012 | Volz | G06Q 30/0631 |
| | | | 705/13 |
| 2014/0253326 A1* | 9/2014 | Cho | H04W 4/90 |
| | | | 340/539.11 |
| 2016/0098928 A1* | 4/2016 | Rodrich | G08G 1/142 |
| | | | 340/932.2 |
| 2016/0240086 A1* | 8/2016 | Nicodemus | G08G 3/00 |
| 2016/0267435 A1* | 9/2016 | Eid | G08G 3/00 |
| 2017/0148230 A1* | 5/2017 | Richard | H04L 67/141 |
| 2017/0168155 A1* | 6/2017 | Richard | G01S 13/325 |
| 2019/0355241 A1* | 11/2019 | Kalagani | G08B 29/26 |
| 2022/0019810 A1* | 1/2022 | Farber | H04N 7/18 |
| 2022/0122465 A1* | 4/2022 | Wilhelmsson | B64U 10/14 |
| 2023/0011288 A1* | 1/2023 | Larsen | G06Q 50/06 |
| 2023/0237859 A1* | 7/2023 | Nakano | G06Q 50/10 |
| | | | 701/21 |

* cited by examiner

*Primary Examiner* — Zhen Y Wu
(74) *Attorney, Agent, or Firm* — McCormick, Paulding & Huber PLLC

(57) ABSTRACT

A marina slip occupancy detection system includes at least one watercraft detector configured to detect the presence and/or absence of a watercraft in a target area. A process of the watercraft detector is configured to communicate with a remote server with indications of occupancy or occupancy change. The remote server is configured to notify a dockhand, marina manager, and/or the watercraft owner/operator depending on the occupancy change and predetermined configurations of the remote server.

20 Claims, 3 Drawing Sheets

MARINA SLIP OCCUPANCY DETECTION

TECHNICAL FIELD

The present disclosure generally relates to detecting slip occupancy and, in particular, to devices and systems for detecting and notifying marina management of occupancy of a marina slip for watercraft.

BACKGROUND

In the marina industry a significant revenue source are transient boat slips rental where the marina operation staff may re-rent a slip for one or more shorter duration stays when the longer duration renter is not currently using the slip. One problem marina operation staff often face is that they are not aware in a timely manner when these slips are no longer occupied and could be rented again. The long-term holders (e.g. seasonal or annual renters) do not always notify the marina office management when they are leaving and returning, thereby making the marina operation staff unaware of potential revenue opportunities. There are also cases where expected watercraft arrivals actually arrive at a much earlier or later time than expected and prompt notification to a dockhand to assist with docking is helpful to the watercraft operator. There is also a problem of slip theft where a watercraft may dock at an unoccupied slip and leave before it is noticed by the marina operation staff. The marina operation staff received no compensation for this dockage and may be unaware that the watercraft ever occupied the slip.

SUMMARY

The present disclosure advantageously provides devices, systems and methods for performing marina slip occupancy detection. The devices and systems disclosed herein can be arranged to detect when a watercraft (e.g. boat, jet-ski, etc.) arrives or leaves a marina slip. Timely notification of the arrival or departure of a watercraft from monitored slips at the marina allows for marina operation staff to more effectively operate the marina. For example, timely notification of the arrival or departure of watercraft allows for marina operation staff to advertise to non-docked watercraft that space is available for docking, be more promptly aware when slip theft is occurring, and more promptly alert dockhands (part of marina operation staff) to attend to arriving watercraft belonging to long-term renters of the marina.

In some embodiments, a marina slip occupancy detection system includes a remote server and a watercraft detector. The watercraft detector includes an occupancy sensor configured to detect a presence and/or an absence of a watercraft in a target area and to generate an occupancy signal based on the detected presence and/or the detected absence. The watercraft detector further includes a processor configured to receive the occupancy signal from the occupancy sensor. The processor is configured to communicate with the remote server to provide an occupancy indication of a slip associated with watercraft detector.

In some embodiments, the marina slip occupancy detection system includes a plurality of watercraft detectors configured to detect the presence and/or absence of a watercraft in a respective target area or slip. The processor of each of the plurality of watercraft detectors is configured to communicate with the remote server to provide an occupancy indication of each respective target area or slip.

In some embodiments, a method of monitoring marina slip occupancy includes detecting, with at least one watercraft detector, an occupancy of a plurality of slips for watercraft; communicating, by the at least one watercraft detector, with a remote server to provide an occupancy indication of each slip of the plurality of slips; and communicating, by the remote server, with a notification device to indicate a change in occupancy status of a slip of the plurality of slips.

Objects, features and advantages of the present invention will become apparent in light of the description of embodiments and features thereof, as enhanced by the accompanying figures.

DETAILED DESCRIPTION

Figure 1:
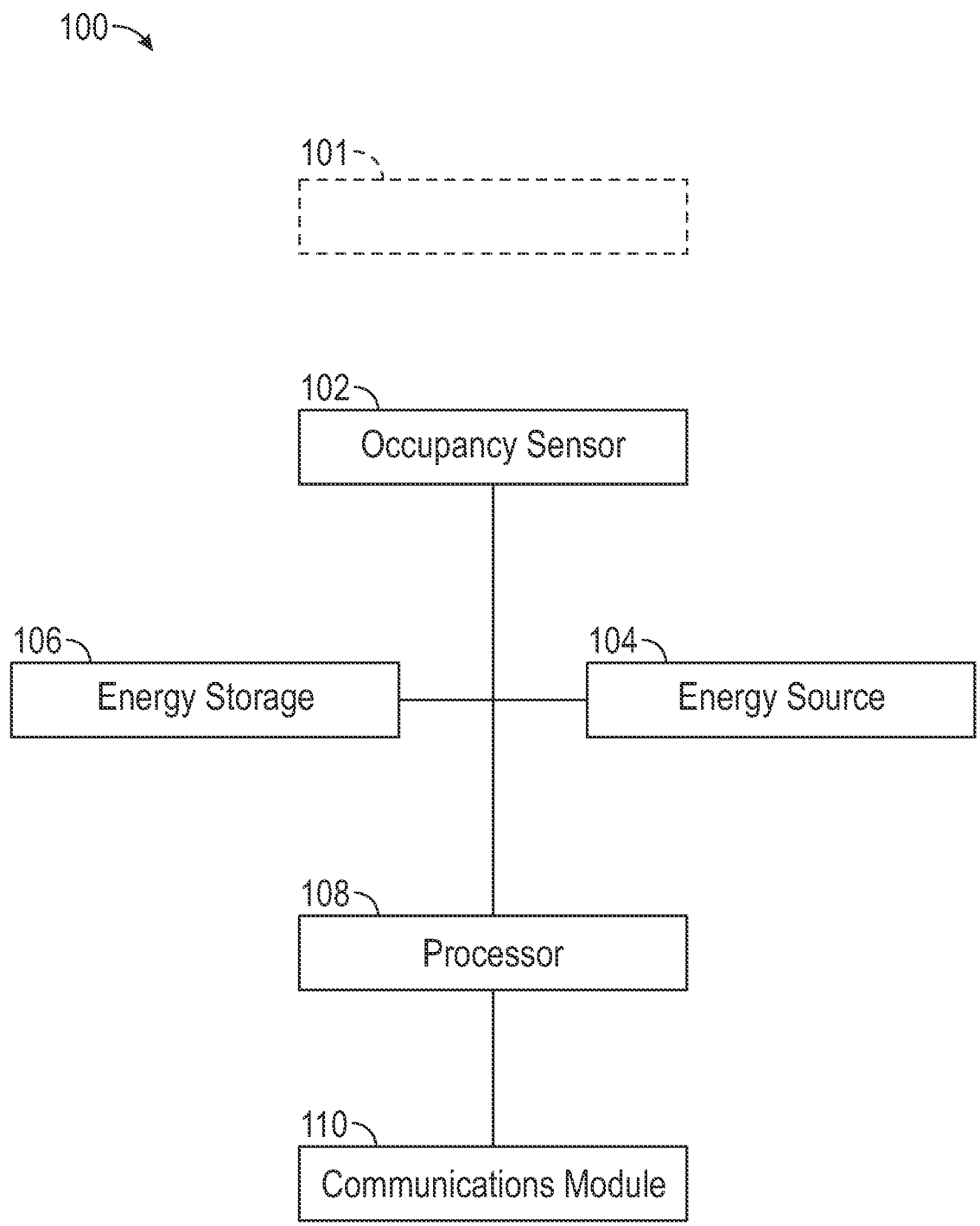
FIG. 1 is a schematic diagram of a watercraft occupancy detector in accordance with the present disclosure.

Referring to FIG. 1, a schematic diagram of an exemplary watercraft detector 100 is shown according to the present disclosure. The detector 100 includes an occupancy sensor 102, an energy source 104 and/or an energy storage 106, a processor 108 and a communications module 110.

The occupancy sensor 102 can be configured in the form of any known occupancy detector. For example, the occupancy sensor 102 may be a passive infrared (PIR) sensor, ultrasonic sensor, break beam sensor or camera. In some embodiments, the occupancy sensor 102 can be a power pedestal electricity usage/connection sensor that detects when a watercraft hooks up to and/or disconnects from a power pedestal connection associated with the slip. Whether integrated with a power pedestal or a standalone occupancy sensor unit, the occupancy sensor 102 is preferably weather-resistant or weatherproof such that the sensor 102 can be installed in outdoor marina environments, where harsh wind, rain and sunlight elements are often encountered.

The occupancy sensor 102 is configured to detect the presence and/or the absence of a watercraft in a target area 101. The occupancy sensor 102 is further configured to generate an occupancy signal based on the detected presence and/or absence of a watercraft in the target area 101.

The energy source 104 can be any source providing electric power, such as an electric grid or solar cell(s) or a hardwired data line. The energy storage 106 can be a battery, such as a lithium ion rechargeable battery. In some embodiments, the watercraft detector 100 operates solely off of energy source 104 power without an energy storage 106. In some embodiments, the energy storage 106 is provided to power the watercraft detector 100 during periods of interruption of electric service of the energy source 104.

The processor 108 is configured to communicate with an external device or system through the communications module 110. The communications module 110 is configured to communicate with external devices and/or systems through any known means of wired and/or wireless communication protocols. For example, the communications module 110 may be configured to communicate with a remote server through wi-fi, cell towers, radio networks, etc. In some embodiments, the communications module 110 is configured to communicate over a power source wire, or through blinking visible or non-visible lights. In some embodiments, the communication may be through a marina's existing Wi-Fi amenity that is offered to guests.

Figure 2:
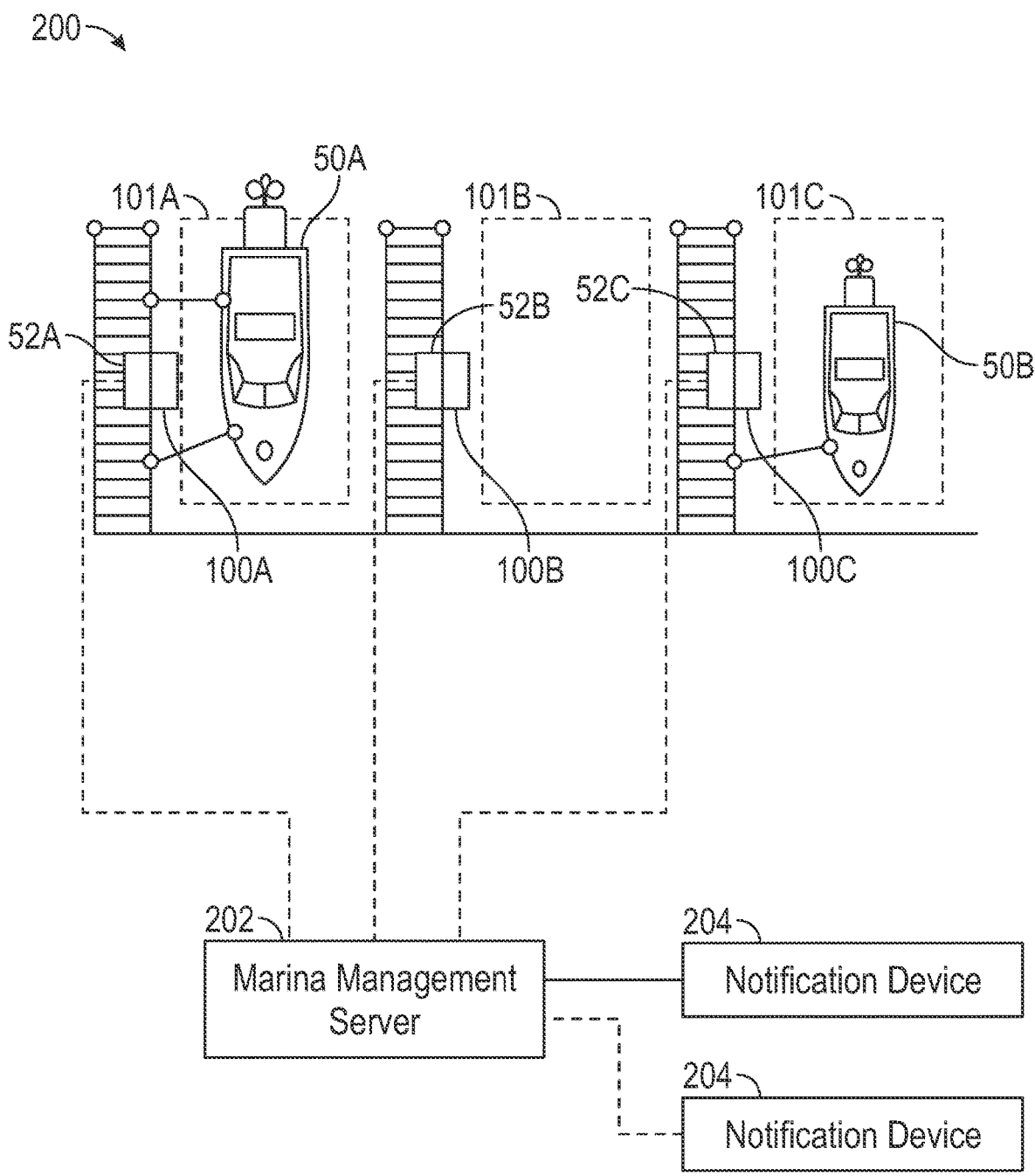
FIG. 2 is a schematic diagram of a marina slip occupancy detection system in accordance with the present disclosure.

Referring to FIG. 2, a schematic diagram of an exemplary marina slip occupancy detection system 200 is shown according to the present disclosure. The system 200 includes three watercraft detectors 100A, 100B, 100C (collectively "100") each optionally associated and/or integrated with a dedicated power pedestal 52A, 52B, 52C, a marina management server 202 and at least one notification device 204 configured to communicate with the marina management server 202 (or "remote server"). Each watercraft detector 100 is configured to detect the presence and/or absence of watercraft at respective target areas 101A, 101B, 101C (collectively "101"). Each target area 101 is associated with an area where a watercraft can dock at a marina. While the shown system 200 is shown with three watercraft detectors 100 for detecting the occupancy at three slips, it should be understood that a system 200 according to the present disclosure can adapted based on the size and needs of any marina. Thus, the system 200 can be employed by any marina having one or more slips and, thus, one or more target areas 101 for occupancy detection.

In FIG. 2, a watercraft 50A is docked in a first slip and within the target area 101A monitored by the watercraft detector 100A. No watercraft is docked in a second slip or within the target area 101B monitored by the watercraft detector 100B. Another watercraft 50B is docked in a third slip and within the target area 101C monitored by the watercraft detector 100C. The processor 108 for each watercraft detector 100 communicates with the remote server 202 to provide an occupancy indication of the target area 101 or slip the respective watercraft detector 100 is associated with. The marina management server 202 communicates with the notification device(s) 204 in real-time to provide alerts, statuses and/or status changes of each slip.

In some embodiments, the processor 108 is configured to continuously provide the occupancy status of each slip by communicating the occupancy indication to the marina management server 202, or periodically by periodically providing the status of the slip to the server 202 at specified intervals (e.g. every 1 minute, 5 minutes, or 10 minutes, etc.). In some embodiments, the processor 108 is configured to only communicate with the marina management server 202 when there is a change in status of the slip, i.e. a detected occupancy of the target area 101 changing from watercraft presence detected to watercraft absence detected or a detected occupancy of the target area changing from watercraft absence detected to watercraft presence detected.

Figure 3:
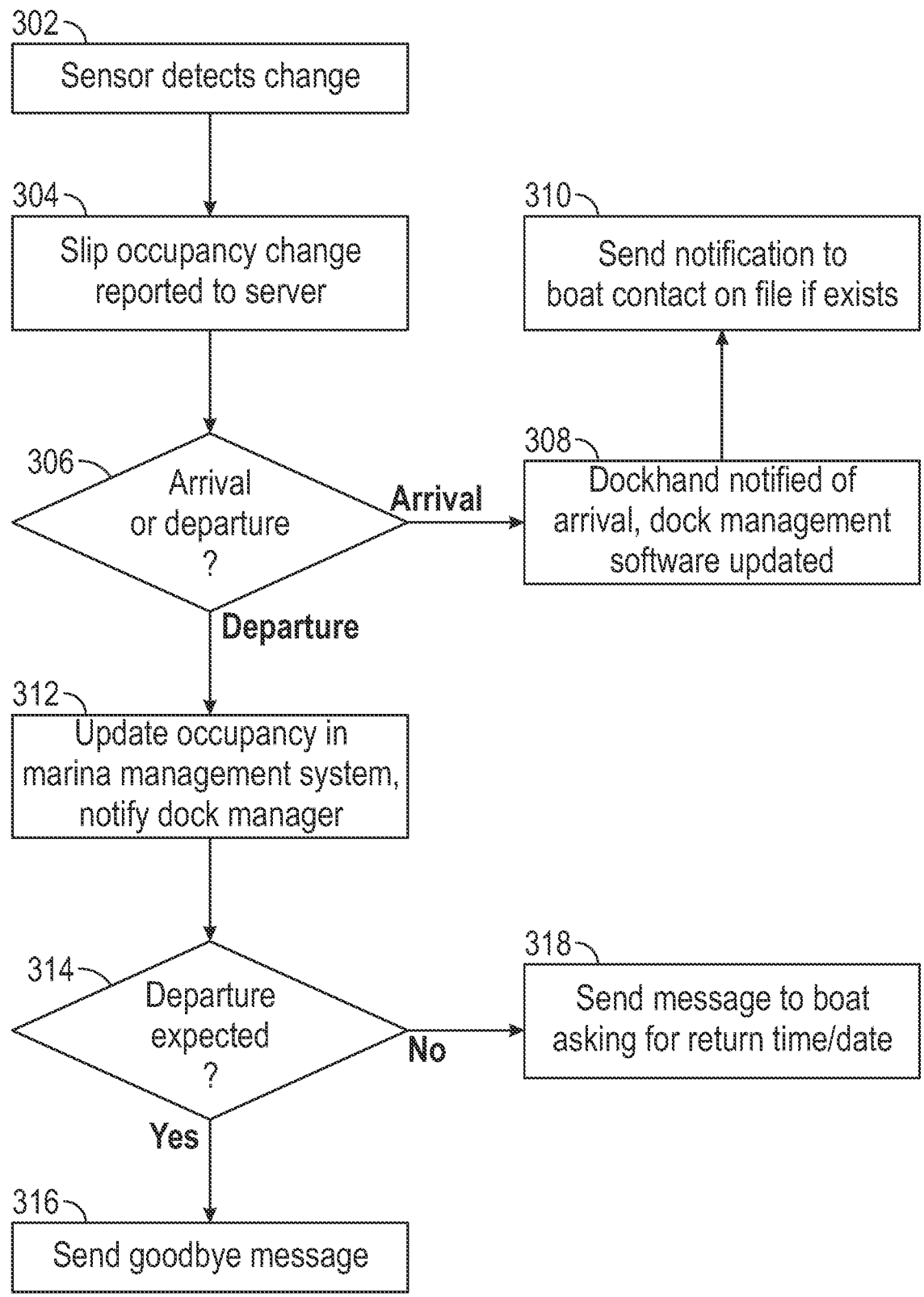
FIG. 3 is a flow diagram of a marina slip occupancy detection method in accordance with the present disclosure.

Referring to FIG. 3, a flow diagram of an exemplary method of marina slip occupancy detection is shown according to the present disclosure. The method beings at block 302, where a watercraft detector 100 detects a change in occupancy, i.e. from detected presence to detected absence of watercraft or from detected absence to detected presence of watercraft. The method proceeds to block 304, where the processor 108 of the watercraft detector 100 communicates with a remote server 202 of the occupancy change. Then, at block 306, the remote server 202 determines whether the slip occupancy change involves a watercraft arrival or departure. If arrival, the remote server 202 at block 308 a dockhand is notified through a notification device 204. Optionally, the remote server 202 can proceed to block 310 and send a communication to a boat contact on file, if one exists. For example, if the occupancy change of a slip belonging to a long-term renter, the remote server 202 can send a communication to the phone number, email address, or other contact means, that a dockhand is on their way to attend to the watercraft. Depending on the interaction level desired, the message could trigger interactive messaging with the boat owner/operator to trigger a workflow with marina management server (hosted on the remote server 202 or other server) via API calls. For example, the remote server 202 may be configured to generate and communicate a link to an online booking platform if boat information is known and not under contract with the marina operating entity.

If the remote server 202 determines that the occupancy change is a watercraft departure, the method proceeds to block 312 where the marina management system is updated and notification is provided to a dock manager through a notification device 204. Optionally, the remote server 202 can proceed to block 314 and determine whether the watercraft departure was expected. If expected, the remote server 202 proceeds to send a goodbye message at block 316. For example, the remote server 202 can send a communication to the contact information confirming departure of the watercraft. If not expected, the remote server 202 can at block 318 send a communication to the contact on file requesting a return date and/or time.

In some embodiments, a single watercraft detector 100 and/or occupancy sensor 102 is configured to monitor and detect occupancy of more than one target area 101. For example, in some embodiments, a single camera occupancy sensor 102 may be able to view and detect the occupancy of multiple target areas associated with multiple slips. The processor associated with such a sensor monitoring more than one target area or slip is configured to include in the indication provided to the remote server 202 which target area or slip the occupancy indication is provided for. As such, the remote server 202 in such embodiments will not be configured to only interpret communications from one processor 108 as being only associated with one target area or slip of the marina.

In some embodiments, more than one watercraft detector 100 and/or occupancy sensor 102 may be arranged for monitoring or detecting the presence and/or absence of a watercraft in a single target area 101. Additional detectors 100 and/or sensors 102 may be advantageous for providing redundancy or increasing confidence of occupancy detection. For example, a slip having more than one detector 100 or sensor 102 may advantageously be able to disregard false alarms or notifications that would be generated by a single detector 100 or sensor 102. For example, the processor 108 or remote server 202 may be configured to not indicate a change in occupancy unless two or more detectors 100 or sensors 102 were in agreement with their detections. The two or more detectors 100 or sensors 102 could be arranged spatially close to each other or instead spaced apart so that one detector 100 or sensor 102 is arranged substantially near where a front portion of a watercraft would be arranged when occupying the target area 101 or slip and the other detector 100 or sensor 102 is arranged substantially near where a rear portion of a watercraft would be arranged when occupying the target area or slip.

Advantageously, the devices, systems and methods of the present disclosure allow for optimized marina management by marina operation staff. The improved marina slip occupancy provided by the present disclosure provides for optimized outcomes that can lead to more effective service for long-term slip renters as well as increase revenue opportunities by making available slip rentals more timely notified to staff as well as more timely notification of individuals committing slip theft.

The system, computers, servers, devices and the like described herein may be any computer-based device having the necessary electronics, computer processing power, interfaces, memory, hardware, software, firmware, logic/state machines, databases, microprocessors, communication links, displays or other visual or audio interfaces, printing devices, and any other input/output interfaces, to provide the functions or achieve the results described herein. Computer or computer-based devices described herein may include any number of computing devices capable of performing the functions described herein, including but not limited to embedded computers, discrete processors, desktop computers, tablets, laptop computers, smartphones, smart televisions, and the like.

Although various features have been shown in different figures for simplicity, it should be readily apparent to one of skill in the art that various features may be combined without departing from the scope of the present disclosure.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A method of monitoring marina slip occupancy comprising:
    detecting, with at least one watercraft detector, an occupancy of a plurality of slips for watercraft;
    communicating, by the at least one watercraft detector, with a remote server to provide an occupancy indication of each slip of the plurality of slips;
    communicating, by the remote server, with a notification device of marina management to indicate a change in occupancy status of a slip of the plurality of slips;
    notifying, with the notification device, a user of the change in occupancy status of the slip, the user being a member of the marina management; and
    transmitting, by the remote server, a message to a phone number or email address associated with the slip after the change in occupancy status;
    wherein the message asks for a return date and/or time when the change in occupancy status is a departure and not expected.

2. The method according to claim 1, further comprising generating, by the notification device, a visual and/or audible alert indicating the change in occupancy status of the slip.

3. The method according to claim 1, wherein the user is a dockhand.

4. The method according to claim 1, wherein the watercraft detector comprises an occupancy sensor, the occupancy sensor being a passive infrared sensor, ultrasonic sensor or break beam sensor.

5. The method according to claim 1, wherein the watercraft detector comprises an occupancy sensor, the occupancy sensor being a camera.

6. The method according to claim 1, wherein the watercraft detector comprises an occupancy sensor, the occupancy sensor being a power pedestal electricity usage/connection sensor.

7. The method according to claim 1, wherein the communicating, by the at least one watercraft detector, with the remote server occurs continuously.

8. The method according to claim 1, wherein the communicating, by the at least one watercraft detector, with the remote server occurs periodically.

9. A method of monitoring marina slip occupancy comprising:
    detecting, with at least one watercraft detector, an occupancy of a plurality of slips for watercraft;
    communicating, by the at least one watercraft detector, with a remote server to provide an occupancy indication of each slip of the plurality of slips;
    communicating, by the remote server, with a notification device of marina management to indicate a change in occupancy status of a slip of the plurality of slips;
    notifying, with the notification device, a user of the change in occupancy status of the slip, the user being a member of the marina management; and
    transmitting, by the remote server, a message to a phone number or email address associated with the slip after the change in occupancy status;
    wherein the message includes a link to booking platform when the change in occupancy status is an arrival and not expected.

10. The method according to claim 9, wherein the watercraft detector comprises an occupancy sensor, the occupancy sensor being a passive infrared sensor, ultrasonic sensor or break beam sensor.

11. The method according to claim 9, wherein the watercraft detector comprises an occupancy sensor, the occupancy sensor being a camera.

12. The method according to claim 9, wherein the watercraft detector comprises an occupancy sensor, the occupancy sensor being a power pedestal electricity usage/connection sensor.

13. The method according to claim 9, wherein the communicating, by the at least one watercraft detector, with the remote server occurs continuously.

14. The method according to claim 9, wherein the communicating, by the at least one watercraft detector, with the remote server occurs periodically.

15. A method of monitoring marina slip occupancy comprising:
    detecting, with at least one watercraft detector, an occupancy of a plurality of slips for watercraft:
    communicating, by the at least one watercraft detector, with a remote server to provide an occupancy indication of each slip of the plurality of slips;
    communicating, by the remote server, with a notification device of marina management to indicate a change in occupancy status of a slip of the plurality of slips;
    notifying, with the notification device, a user of the change in occupancy status of the slip, the user being a member of the marina management; and
    transmitting, by the remote server, a message to a phone number or email address associated with the slip after the change in occupancy status;
    wherein the message indicates that a dockhand is on the way to the slip when the change in occupancy status is an arrival and the slip is associated with a renter of the slip.

16. The method according to claim 15, wherein the watercraft detector comprises an occupancy sensor, the occupancy sensor being a passive infrared sensor, ultrasonic sensor or break beam sensor.

17. The method according to claim 15, wherein the watercraft detector comprises an occupancy sensor, the occupancy sensor being a camera.

18. The method according to claim 15, wherein the watercraft detector comprises an occupancy sensor, the occupancy sensor being a power pedestal electricity usage/connection sensor.

19. The method according to claim 15, wherein the communicating, by the at least one watercraft detector, with the remote server occurs continuously.

20. The method according to claim 15, wherein the communicating, by the at least one watercraft detector, with the remote server occurs periodically.

* * * * *